United States Patent [19]

Keoteklian

[11] Patent Number: 4,609,469

[45] Date of Patent: Sep. 2, 1986

[54] METHOD FOR TREATING PLANT EFFLUENT

[75] Inventor: Hagop Keoteklian, Santa Maria, Calif.

[73] Assignee: Entenmanns, Inc., Bayshore, N.Y.

[21] Appl. No.: 663,112

[22] Filed: Oct. 22, 1984

[51] Int. Cl.$^4$ .............................................. C02F 3/28
[52] U.S. Cl. .................................. 210/609; 210/612; 210/631
[58] Field of Search ............... 210/631, 639, 705, 727, 210/760, 605, 609, 612, 613, 622, 623, 630, 627

[56] References Cited

U.S. PATENT DOCUMENTS

| | | | |
|---|---|---|---|
| 3,847,803 | 11/1974 | Fisk | 210/631 X |
| 4,067,801 | 1/1978 | Ishida et al. | 210/631 X |
| 4,173,532 | 11/1979 | Keoteklian | 210/631 |
| 4,293,421 | 10/1981 | Green | 210/631 X |
| 4,297,216 | 10/1981 | Ishida et al. | 210/631 X |

Primary Examiner—Thomas Wyse
Attorney, Agent, or Firm—Thomas R. Savoie; Bruno P. Struzzi; Daniel J. Donovan

[57] ABSTRACT

A method for improving the waste treatment of industrial bakery plant effluent by taking clarified effluent which has been subjected to pH changes to form sludge in a primary clarifier, removing said effluent from the initial sludge in the clarifier, and circulating it after sludge separation therefrom into a series of three underground tanks where a solution of activated anaerobic bacteria is metered. The residence time, for the effluent and bacteria in said tanks is 48 to 72 hours at a temperature of 28° C. to 48° C. Thereafter, the treated effluent is recirculated once again to a lower clarifier which feeds any sludge formed into a sludge concentration tank, while the aqueous effluent remaining is further processed in a sand filter, an ozonator, and a reverse osmosis unit to achieve a BOD level of below 150 (mg/l) and a COD level of below 80 (mg/l).

9 Claims, 2 Drawing Figures

METHOD FOR TREATING PLANT EFFLUENT

TECHNICAL FIELD

This invention relates to improvements in the treatment of waste water, and more particularly, to the removal of suspended and dissolved solids from the liquid effluent of an industrial plant.

BACKGROUND ART

The invention constitutes an improvement in the art set forth in my earlier U.S. Pat. No. 4,173,532 issued Nov. 6, 1979 and also entitled "Method For Treating Plant Effluent". Since many of the details of this invention are to be found in the disclosure of the foregoing patent said details are incorporated by reference herein. While the method of the invention, as is the case of the prior invention, is primarily directed to the separation of waste materials from the water in the effluent of an industrial plant such as a cake baking plant or a donut making plant, it is also more broadly useful for the treatment of sanitary wastes. My earlier U.S. Pat. No. 4,173,532 is a physical-chemical process. The present invention, however, is a physical chemical-biological process, including primary, secondary and tertiary treatments. It is a principal object of this invention to get pure, drinkable water from waste water which is bad or non-drinkable. The treated water should have the lowest possible level of BOD (BiologicalOxygen Demand) and COD (Chemical Oxygen Demand).

SUMMARY OF THE INVENTION

Briefly stated, the invention strives to further improve the waste treatment in bakery art by taking clarified industrial effluent subjected to pH changes to form sludge in a primary clarifier, removing said effluent from the initial sludge in the clarifier, and circulating it after sludge separation therefrom into a series of three underground tanks where a solution of activated anaerobic bacteria is metered. The residence time, for the effluent and bacteria in said tanks is 48 to 72 hours at a temperature of 28° C. to 48° C. Thereafter, the treated effluent is recirculated once again to a lower clarifier which feeds any sludge formed into a sludge concentration tank, while the aqueous effluent remaining is further processed in a sand gravity filter, an ozonator, and finally a reverse osmosis unit to achieve a BOD count of below 45 to 150 (mg/l).

BEST MODE FOR CARRYING OUT THE INVENTION

Figure 1:
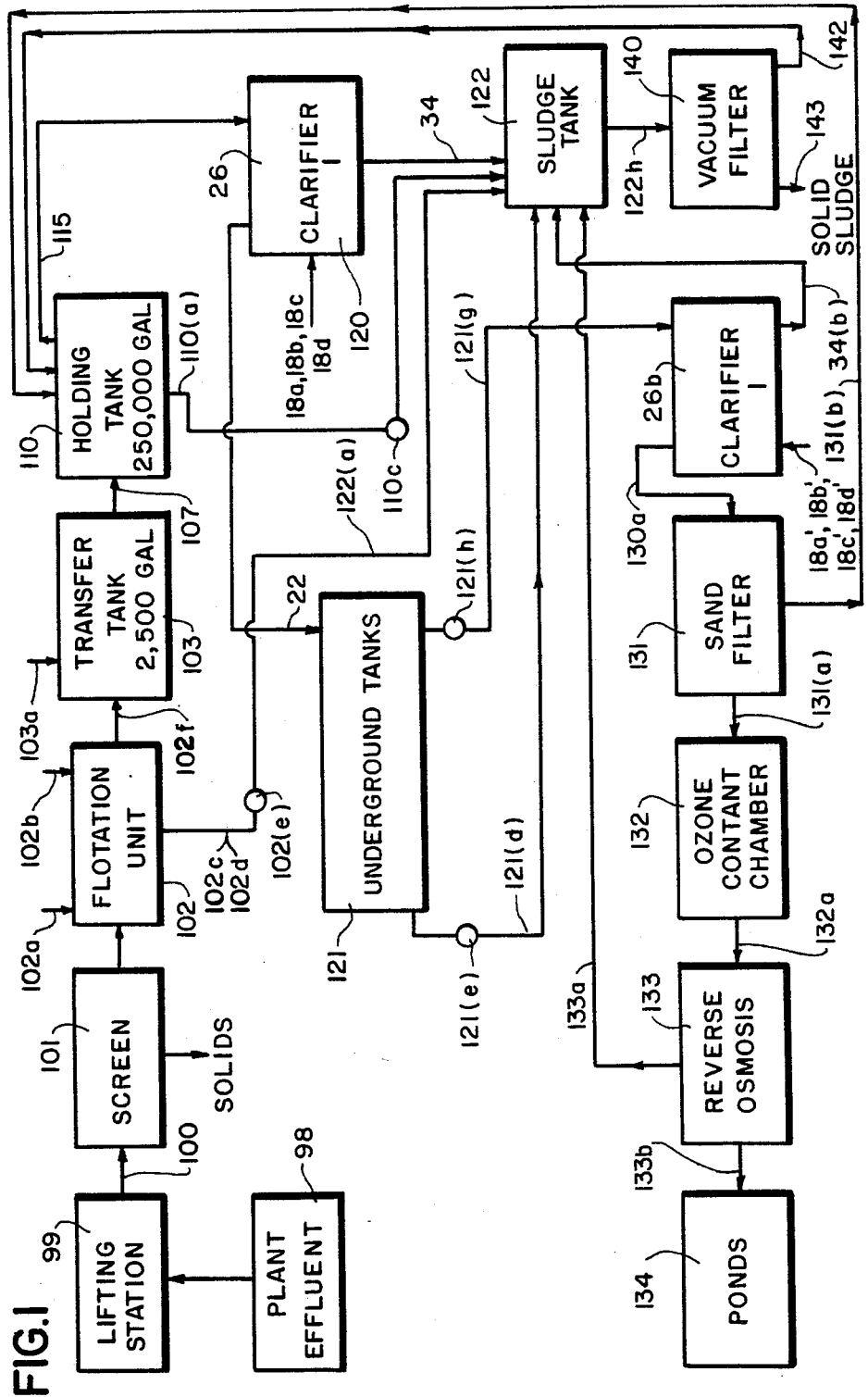
FIG. 1 is a diagram of the apparatus for carrying out the method of the invention.

In accordance with this invention, an incoming waste stream to be treated is first conditioned with alum and anionic polyelectrolyte in a flotation tank and the sludge removed to a concentration tank. The comparatively clarified water recovered from this flotation unit then enters a transfer tank, where it is admixed with a cationic polyelectrolyte prior to entering a holding tank. Thereupon, the water is pumped to a primary clarifier, which in the case of a bakery waste, for example, has chemical materials such as ferric chloride, lime, alum and an anionic solution added thereto to coagulate and flocculate suspended and dissolved solids, as explained in detail in U.S. Pat. No. 4,173,532. The sludge formed at the conical bottom of the primary clarifier is ejected to a sludge tank, whereas the relatively clarified water goes into underground tanks (three or more).

The underground tanks are adapted to receive activated anaerobic bacteria which devours and decomposes the remaining starches, sugars, fats, and albumens, etc. If the initial temperature of the waste water prior to clarification is 45° C. to 55° C., by the time the water passes from the flotation unit and primary clarifier to the underground tanks the temperature of the water drops to 30° C. to 40° C. which is ideal for the anaerobic bacteria to do the biological decomposition of the suspended and dissovled solids in the waste water. Thus, there is no need of heating the incoming water to the underground tanks where suspended and dissolved solids such as sugars, starches, gluten, protein, fats, albumens, etc. in the absence of air or oxygen are decomposed by the action of activated anaerobic bateria to carbon and to such gases as carbon monoxide, carbon dioxide, methane, hydrogen sulfide, etc. The purposes of the invention is to obtain an acceptable level of BOD and COD of the final treated waters.

To obtain the optimum results from the use of an anaerobic bacteria in this fashion, it is desirable to provide a warm, constant temperature environment, ranging from 28° C. to 48° C. At lower temperatures the activity of the bacteria slows down and eventually dies. Since geographic locations and seasonal changes can cause fluctuations of temperature on the surfaces of one or more of the open tanks, it is preferred that the tanks be built underground, or at the vrey least half-underground, to provide a more or less constant warm temperature during the four seasons of the year. In the absence of air or oxygen the anaerobic bacterial will react and decompose almost all of the remaining dissolved and suspended solids in the aqueous media. The sugars, starches, glutens, albumens, proteins, and colloids are reduced to their elemental components, namely, carbon plug gaseous methane, carbon dioxide, carbon monoxide, hydrogen sulfide and even some benzene under certain conditions. These latter gases may be piped to a boiler to produce steam for heating purposes and thus serve to provide an energy source.

It is recommended that the underground holding tanks be built in three equal sections, the bottom of one section being lower than that of a previous section, and a trench pump being located at the lower-most section for pumping out the precipitate sludge to the sludge tank. It is recognized that some of the carbonaceous material will remain in suspension even after the 48 to 72 hours (or longer) detention time in the underground holding tank, giving the water a black color. Nevertheless, at this point almost all of the suspended and dissolved solids have been eliminated or decomposed and they are then fed to the lower clarifier or to another flotation unit and in turn discharged into a sludge concentration tank.

After carbonaceous liquids are discharged from the top of the underground holding tank and pumped to the lower clarifier, the same chemicals are metered as before but at a lower rate, viz, ferric chloride, lime water, aluminum sulphate and anionic polyelectrolyte. Once again, the sludge formed at the bottom of the lower clarifier will be ejected by a time-solenoid valve into the sludge concentration tank using the procedures setforth in my aforementioned patent, the clarified water entering a sand gravity filter.

Back wash water from the sand gravity filter will reenter a massive (250,000 gal) holding tank, whereas filtered water will enter an ozone contact chamber. Ozone is preferred over chlorine since chlorine will not kill virus or decompose and eliminate carcinogenous substances but instead forms new ones, (chlorophenols, chloroamines, etc.). The ozone kills viruses and germs and does not form carcinogens, and decomposes carcinogens found in the water.

The treated water is thereafter processed in a reverses osmosis unit comprised of an ultrafilter, a prefilter and reverse osmosis unit equipped with accessories and instrumentation as is well known. Here also, the concentrate will enter the sludge concentration tank whereas the permeate or purified water will be ready for reuse, ejection to the ground or to a waterway. Thus it will be seen that the discharge from the lower clarifier will be further clarified in the sand gravity filter as well as in a reverse osmosis unit.

The sludge concentration tank is an important part of the present system. It receives the sludges from the clarifiers, the three underground holding tanks, the massive holding tank, and the the reverse osmosis unit. The large quantities of the various solids dispersed or suspended in the liquor from the primary clarifier would otherwise tend to overwhelm or clog the various apparatus. The holding period of typically 48 to 72 hours will thus further enhance the treatments insofar as the second clarifier is concerned and avoid the overburdening of the sand gravity filter, thus maximizing the processing in the later units, particularly the reverse osmosis unit.

DETAILED DESCRIPTION OF THE DRAWINGS

The materials to be utilized in the process of the invention and the equipment used are all essentially those set forth in my aforementiond patent with the exception of the three underground holding tanks. The description will proceed on the basis of the treatment of a raw effluent from an industrial cake making plant whereafter material has passed for further treatement.

With references to the figures, plant effluent 98 is transferred from lifting station 99 and via pipe 100 passes through hydroseive screen 101 to remove large size particles such as fruit rinds, nuts, paper, etc. and thereby prevent these from passing into the treatment system. The screened effluent is then passed to a flotation unit 102 whereat any remaining relatively large sized suspended solids are removed. Here alum solution 102(a) along with an anionic polyelectrolyte solution 102(b) are metered into the incoming stream to form flocs out of the suspended solids and colloids. These along with other suspended solids float to the top of the liquid in flotation unit 102 and are skimmed out at 102(c) and along with the bottom sludge at 102(d) are pumped at 102(e) through line 122(a) to the sludge tank 122. The effluent from the flotation unit 102 passes by way of pipe 102(f) to transfer tank 103. While passing through the transfer tank 103, the effluent has added thereto a cationic polyelectrolyte (cyanamid polyelectrolyte) 103(a). Other agents such as cationic polymeric coagulant and cationic polyelectrolyte may be added. The coagulant is a liquid solution fed at an appropriate rate into the effluent to form flocculation and coagulation of starch. The effluent with these materials added thereto exits the transfer tank 103 through pipe 107 and is delivered to a large holding tank 110 (250,000 gallon).

The cationic coagulant has a high positive charge which, when introduced into the bakery waste water, coagulates and flocculates the starches which are negatively charged. As the starches coagulate and flocculate, the flocs collide with neighboring fats and other suspended molecules while the cationic polyelectrolyte, of a lesser negative charge, binds the flocs together forming a large floc which then precipitates. In this manner, not only starches but also fats, glutens and the like are removed from the plant effluent and pass through lines 110(a), under the control of pump 110(c) to sludge tank area 122. Holding tank 110, where the aforementioned coagulation and flocculation occurs, has a capacity of about 250,000 gallons (40.0 feet in diameter; 32.5 feet high). The flocs precipitate to the conical bottom of the tank, carrying with them most of the fats, and suspended solids.

Figure 2:
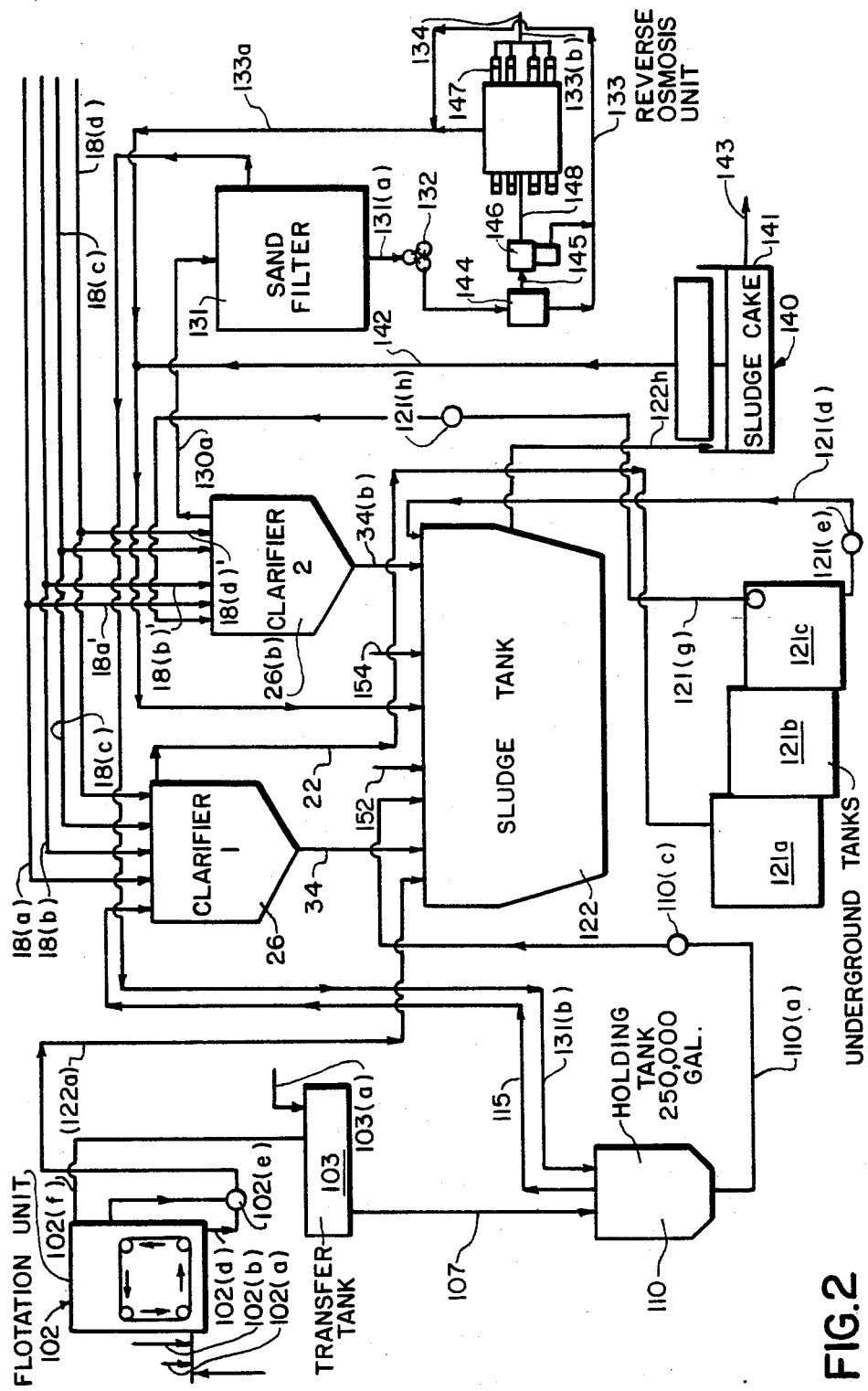
FIG. 2 is a schematic amplifying diagram of the apparatus.

From the holding tank 110, the waste water is pumped through line 115 to the high primary clarifier 26 where ferric chloride 18(a) lime water 18(g), aluminum sulfate 18(c) and anionic polyelectrolyte solution 18(d) are metered as explained in detail in earlier U.S. Pat. No. 4,173,532. The sludge formed at the conical bottom of the clarifier 26 is ejected at 34 to sludge concentration tank 122. Clarified water in this primary separation passes by line 22 to the bio-reaction underground holding tanks generally shown as 121 (FIG. 1) and comprising in particular a series of three tanks 121(a), 121(b) and 121(c) (FIG. 2). Liquid effluent from the lower of the three tanks passes through line 121(g) under the control of pump means 121(h) to re-enter a second clarification 26(b) which is similarly equipped with ferric chloride 18(a), lime 18(b), alum 18(c) and an anionic solution 18(d) as before at lower concentrations and metered, as explained in detail in the aforesaid patent. Sludge is again collected at the lower extremity of clarifier 26(b) and is passed through line 34(b) to sludge tank 122. Thus, the sludge formed at the conical bottom of the clarifiers 26 and 26(b) in each instance is ejected to the sludge tank 122 by pipes 34 and 34 (b) under the control of a suitable solenoid valve in each instance controlled by timers (not shown).

From the top of the underground holding tank area 121 it will be seen that the separated water is thus pumped under control of pump 121(h) through line 121(g) to lower clarifier 26(b) whereafter the clarified water in line 130(a) enters sand gravity filter 131. The back wash water from the filter 131 goes to the 250,000 gallon tank 110 by pipe means 131(b), whereas the filtrate water goes through a pipe 131(a) to either a chlorine—contact or an ozone contact chamber, preferably an ozone-chamber, 132 for reasons discussed. In either event the water from the contact chamber 132 goes through line 132(a) to a reverse osmosis unit 133, concentrate from the reverse osmosis unit 133 going to the sludge concentration tank 122 by line 133(a) whereas the permeate or purified water, now at a BOD level of about 45 to 150 (mg/l) and a COD count of about 25 to 80 (mg/l), passes line 133(b) and is ejected to the ground or a waterway, as indicated by ponds 134.

It should be noted that sludge concentration tank 122 discharges through line 122(h) to rotary vacuum filter 140, sludge cake from the filter being indicated at 141 and water filtered through the device being indicated at 142, the filtered water being recycled back to the 250,000 gallon holding tank 110 and the sludge being disposed to waste at 143.

The water issuing from clarifier 26(*b*) to sand gravity filter 131 is clarified as it passes filter 131 for entry to the chlorine zone or the ozonization zone 132. The reverse osmosis unit 133 comprises an ultrafilter 144 which feeds a prefilter 146 through line 145, and reverse osmosis unit 147 through line 148, the tubing having accessories and instrumentation not forming a part of this invention. Concentrates from the ultrafilter and the prefiltration unit 144, 146 together with concentrate from the reverse osmosis unit 147 are recycled back to sludge tank 122 through line 133(*a*), whereas the permeate or purified water issuing from the reverse osmosis unit 147 at 133(*b*) is ready for reuse, ejected to the ground, or to a waterway.

It will be seen that sludge tank 122 is an important part of the system. From all parts of the process, sludges, concentrates and precipitates are pumped to the sludge concentration tank to which a generous amount of lime 152 as well as polyelectrolyte 154 are added, as required. The lime is blown with compressed air for thorough mixing and a sufficient amount of the polyelectrolyte helps in the formation of large flocs. After allowing this mixture in tank 122 to settle, for say 6–8 hours, the thickened sludge is pumped to the rotary vacuum filter 140 through line 122(*h*). The vacuum filter 140 eventually provides a cake of sludge which may be loaded to a truck and used for landfill as at 143.

While this invention has been described by reference to a best mode, it is intended to be limited only by reference to the appended claims.

What is claimed is:

1. A process for providing tertiary treatment to an industrial waste water stream which contains dissolved starches, sugars, gluten, protein and fats comprising the sequential steps of:
   (a) treating the waste stream with alum and anionic polyelectrolyte in a flotation unit thereby producing sludge and comparatively clarified water, removing the sludge to a concentration tank and the comparatively clarified water to a transfer tank, admixing the comparatively clarified water with a cationic polyelectrolyte in a holding tank, pumping the thus treated water to a primary clarifier having sufficient coagulants and flocculants added thereto to produce a sludge, and then collecting and separating the resultant sludge from this primary clarification in order to produce a further clarified effluent;
   (b) adding to the further clarified effluent anaerobic activated bacteria in a series of underground tanks;
   (c) holding the clarified effluent in (b) at least 48 hours at a temperature of between 28° C. and 48° C. to substantially devour and decompose suspended and dissolved organic wastes therein;
   (d) recovering the water effluent from the holding area in (c) and circulating it to a second clarifier operative to produce an additional sludge like that produced in the primary clarifier by means of added coagulants and flocculants;
   (e) collecting the additional sludges and separating from them a second clarified water effluent;
   (f) passing the sludges from the steps (a) and (e) to a collection sludge tank area for eventual disposal, and
   (g) recirculating the second clarified water to a sand gravity filter to further clarify said water.

2. The process of claim 1 wherein the clarified water effluent in step (c) is held for a substantial period of up to 72 hours.

3. The process of claim 2 wherein the means for holding the clarified water in step (c) comprise a plurality of three tanks adapted to produce a precipitated carbon sludge and a thus clarified water.

4. The process of claim 3 wherein the tanks for holding the clarified water are sequentially lowered to provide the precipitated carbon sludge and the thus clarified water.

5. The process of claim 3 wherein the tanks are at least partially submerged in earth.

6. The process of claim 3 wherein the tanks are completely submerged in earth.

7. The process of claim 6 wherein the filtrate from the sand gravity filter eventually goes through a reverse osmosis system.

8. The process of claim 7 wherein the solids discharged from the reverse osmosis system are conducted back to the sludge collecting area.

9. The process of claim 7 wherein the filtrate from the sand gravity filter is ozonated prior to entering the reverse osmosis system.

* * * * *